(12) United States Patent
Choi et al.

(10) Patent No.: US 7,312,929 B2
(45) Date of Patent: Dec. 25, 2007

(54) VARIABLE FOCUS LIQUID LENS WITH REDUCED DRIVING VOLTAGE

(75) Inventors: Hee Sung Choi, Suwon (KR); Ha Yong Jung, Suwon (KR); Jae Young Bae, Suwon (KR); Jong Yun Kim, Suwon (KR); Jeong Ho Yoon, Sungnam (KR); Young Gi Kim, Suwon (KR); Bae Kyun Kim, Sungnam (KR)

(73) Assignee: Samsung Electro-Mechanics Co., Ltd. (KR)

( * ) Notice: Subject to any disclaimer, the term of this patent is extended or adjusted under 35 U.S.C. 154(b) by 0 days.

(21) Appl. No.: 11/331,194

(22) Filed: Jan. 13, 2006

(65) Prior Publication Data

US 2006/0151754 A1 Jul. 13, 2006

(30) Foreign Application Priority Data

Jan. 13, 2005 (KR) ............... 10-2005-0003433
May 13, 2005 (KR) ............... 10-2005-0040284

(51) Int. Cl.
*G02B 1/06* (2006.01)
(52) U.S. Cl. .................................. 359/665
(58) Field of Classification Search ........ 359/665, 359/666

See application file for complete search history.

(56) References Cited

U.S. PATENT DOCUMENTS 6,369,954 B1* 4/2002 Berge et al. ............ 359/666

2002/0176148 A1  11/2002 Onuki et al.
2006/0215273 A1*  9/2006 Kuiper et al. ............ 359/666

FOREIGN PATENT DOCUMENTS

| JP | 2000-347005 A | 12/2000 |
| WO | WO 00/58763 | 10/2000 |
| WO | WO 2004/099846 A1 | 11/2004 |

OTHER PUBLICATIONS

Chinese Office Action, with English Translation, issued in corresponding Chinese Patent Application No. 200610001147.8, dated on Apr. 6, 2007.
French Search Report issued in corresponding application No. FR 0600340, dated May 2, 2007.

* cited by examiner

*Primary Examiner*—Scott J. Sugarman
*Assistant Examiner*—Darryl J. Collins
(74) *Attorney, Agent, or Firm*—McDermott Will & Emery LLP

(57) ABSTRACT

The invention provides a variable focus liquid lens using electrowetting, comprising a conductive first liquid and an insulating second liquid. At least one of the first liquid composed of electrolyte and the second liquid composed of insulating liquid contains a surfactant for reducing interfacial energy between the first and second liquids. An interfacial portion between the first and second liquids is gathered by surfactant to reduce driving voltage. The variable focus liquid lens according to the invention has about 50% lower driving voltage required for changing focus, ensuring stability of the two fluids.

18 Claims, 3 Drawing Sheets

VARIABLE FOCUS LIQUID LENS WITH REDUCED DRIVING VOLTAGE

CLAIM OF PRIORITY

This application claims the benefit of Korean Patent Application No. 2005-40284 filed on May 13, 2005, and No. 2005-3433 filed on Jan. 13, 2005 in the Korean Intellectual Property Office, the disclosures of which are incorporated herein by reference.

BACKGROUND OF THE INVENTION

1. Field of the Invention

The present invention relates to a variable focus liquid lens, and more particularly, to a variable focus liquid lens using electrowetting, in which at least one of first and second liquids contains a surfactant and an interfacial portion exists between the first and second liquids, thereby reducing driving voltage and minimizing miscibility of the two liquids.

2. Description of the Related Art

In general, electrowetting is a phenomenon in which electric charge at a meniscus is adjusted to vary tensile force of the meniscus. The electrowetting can be used to control micro-fluid and micro-particles in the fluid. Recently, studies have been actively conducted on products using the electrowetting. The electrowetting basically utilizes an electric field and thus the response time is short and a product may be driven with relatively low voltage, which in turn enables miniaturization. The electrowetting has been extensively studied and applied to the fields of liquid lenses, display devices, optical devices, and Micro-Electro Mechanical Systems (MEMS).

However, in the prior art, the electrowetting has not been thoroughly researched, and the studies have been conducted or the products have been developed on the premise that there is no change in interfacial energy between solid and liquid forms, and between liquid and gas forms, allowing only simple control subject to differences in potential.

FIG. 1 illustrates an embodiment of a conventional variable focus liquid lens using electrowetting. As shown in FIG. 1, the conventional variable focus liquid lens 20 includes a solid plate 25 composed of an insulation layer 24 having a certain thickness d and electrodes 26 formed underneath the insulation layer 24, a conductive droplet 22 placed on an upper surface of the solid plate 25, and a driving source 29 having one end electrically connected to the droplet 22 and the other end electrically connected to the electrodes 26 to provide potential difference between the droplet 22 and the electrode 26.

With the above constitution, when the conductive droplet 22 is dropped on the insulation layer 24 and then the driving voltage is applied by driving source 29 between the electrodes 26 and the droplet 22, the curvature radius (the solid line in FIG. 1) of the droplet in a constricted state with no charge is enlarged into the shape of the droplet 28 (the dotted line in FIG. 1) due to the potential difference occurred between the electrodes 26 and the droplet 22. That is, the outer dimension of droplet 22, 28 is changed to vary the focus distance of the light passing therethrough.

In general, the relationship of the contact angle of the solid plate and the interfacial energy can be expressed by Young's equation (Equation 1 below).

$$\gamma_{SL} = \gamma_{SG} - \gamma_{LG} \cos\theta \qquad \text{Equation 1}$$

In the above equation, $\gamma_{SL}$ represents the interfacial energy between solid and liquid, $\gamma_{SG}$ represents the interfacial energy between solid and gas, and $\gamma_{LG}$ represents the interfacial energy between liquid and gas, and $\theta$ represents the contact angle.

In general, when electrolyte exists between the electrodes, a numerical expression of thermaldynamics depending on the voltage application can be explained by Lippman's Equation (Equation 2 below).

$$\gamma = \gamma_0 - \frac{1}{2}cV^2 \qquad \text{Equation 2}$$

From Equations 1 and 2 above, Lippmann-Young Equation (Equation 3 below) is derived.

$$\cos\theta = \cos\theta_0 + \frac{1}{\gamma_{LG}}\frac{1}{2}cV^2 \qquad \text{Equation 3}$$

In the above equation, $\theta$ represents the contact angle when the voltage is applied, $\theta_0$ represents the initial contact angle, c represents the electric capacity, and V represents the applied voltage.

The above Lippmann-Young Equation does not take account for the changes in the interfacial energy between the initial liquid and gas and between solid and gas. The conventional device using electrowetting depends only on the applied voltage, allowing only simple control according to the potential differences.

A modified form of the above Lippmann-Young Equation is as follows in Equation 4 below.

$$\cos\theta = \cos\theta_0 - \frac{\varepsilon}{2\cdot\gamma_1\cdot d}V^2 \qquad \text{Equation 4}$$

In the above equation, $\theta$ represents the contact angle when the voltage is applied, $\theta_0$ represents the initial contact angle, $\epsilon$ represents the dielectric constant between the electrodes, d represents the thickness of the insulation layer, V represents the applied voltage, and $\gamma i$ represents interfacial energy between insulation liquid and electrolyte.

This equation is a general one explaining the operational characteristics of electrolyte and insulation liquid illustrated in FIG. 1. In the above equation, as the $\gamma i$ is smaller, the change in the contact angle of the insulation liquid becomes bigger, which is expected to result in reduction of the driving voltage. However, if the interfacial energy of the two liquids is too small, it is difficult for the two fluids (the electrolyte and the insulation liquid) to exist independently, which may result in mixing of the two fluids or turbidity. Furthermore, the conventional liquid lens using electrowetting cannot achieve a sufficiently stable state, that is, the applied voltage is too high for the surface of the droplet to remain stable and for the droplet to maintain a uniform shape.

SUMMARY OF THE INVENTION

The present invention has been made to solve the foregoing problems of the prior art and it is therefore an object of the present invention to provide a variable focus liquid lens in which the driving voltage required for changing focus is lower and the reliability between the two fluids is ensured.

According to an aspect of the invention for realizing the object, there is provided a variable focus liquid lens using electrowetting, comprising a conductive first liquid and an insulating second liquid: wherein at least one of the first liquid composed of electrolyte and the second liquid composed of insulating liquid comprises a surfactant for reducing interfacial energy between the first and second liquids, whereby an interfacial portion between the first and second liquids is gathered by surfactant to reduce driving voltage.

According to another aspect of the invention for realizing the object, there is provided a variable focus liquid lens capable of varying focus by changing the shape of meniscus formed by a first liquid and a second liquid being non-miscible and having different refraction indexes, comprising: wherein the first liquid composed of electrolyte and the second liquid composed of insulation liquid are disposed in a cell and the second liquid forming a droplet, and a droplet contact area is formed in contact with the droplet in the cell, wherein at least one of the first and second liquids comprises a surfactant to reduce interfacial energy between the first and second liquids, whereby an interfacial portion between the first and second liquids is gathered by surfactant, and means including an electrode and an insulation layer disposed between the electrode and the first and second liquids for applying voltage between the electrode and the first liquid, and wherein the voltage applied by the voltage-applying means is adjusted to change the shape of the meniscus with reduced driving voltage.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Preferred embodiments of the present invention will now be described in detail with reference to the accompanying drawings.

The inventors came to the following learning about a liquid lens using electrowetting. When at least one of electrolyte and insulation liquid contains a surfactant, and an interfacial portion between the first and second liquids is gathered by surfactant, the interfacial energy between the two liquids decreases, which enables reduction of driving voltage necessary for adjusting focus, ensuring non-miscibility of the two fluids. Based on the above learning, the inventors have made the present invention.

In general, surfactant broadly includes hydrocarbon-based, fluorocarbon-based, and carbon silicon-based types. Usually, these surfactants are added to solid or liquid in small amounts for the purpose of reforming interfacial energy and improving Theological property. All of these types of surfactants may be used for the present invention. With a low molecule surfactant, driving voltage is reduced through the surface reforming effect. Also, with a relatively high polymer surfactant, Theological property is reformed to enable unrestricted control of fluid movement between the insulation liquid and the electrolyte, and also single ion motion is induced to secure electric stability.

According to the present invention, the variable focus liquid lens using electrowetting comprises a conductive first liquid and an insulating second liquid, wherein at least one of the first and second liquids have at least one surfactant for reducing interfacial energy of up to 20 dyne/cm between the first and second liquids, and an interfacial portion between the first and second liquids is gathered by surfactant. For the rest of the structural features, any type of structure of the conventional liquid lens using electrowetting can be applied.

Figure 1:
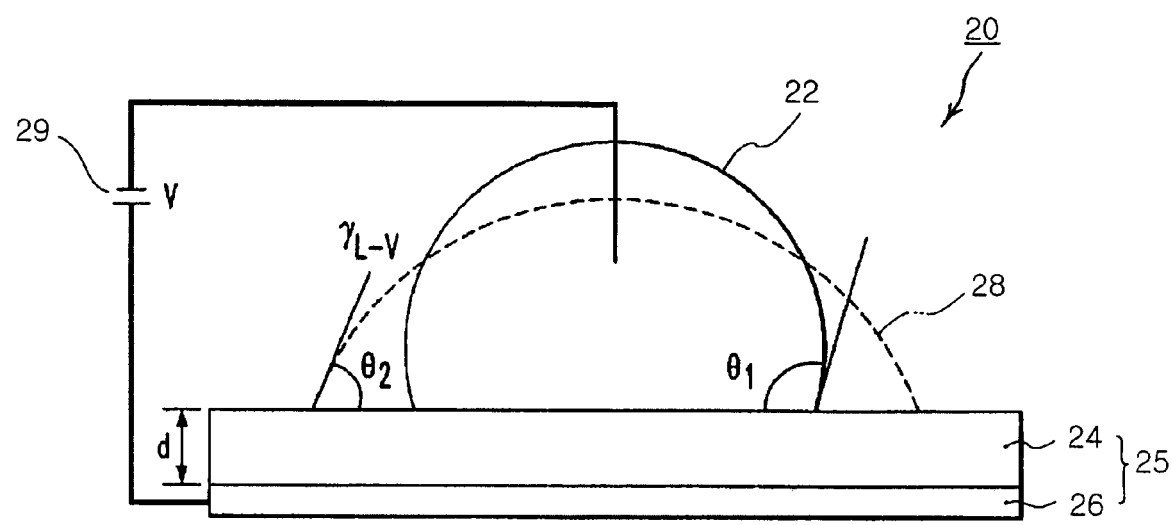
FIG. 1 is a schematic cross-sectional view of a conventional variable focus liquid lens using electrowetting.
Figure 2:
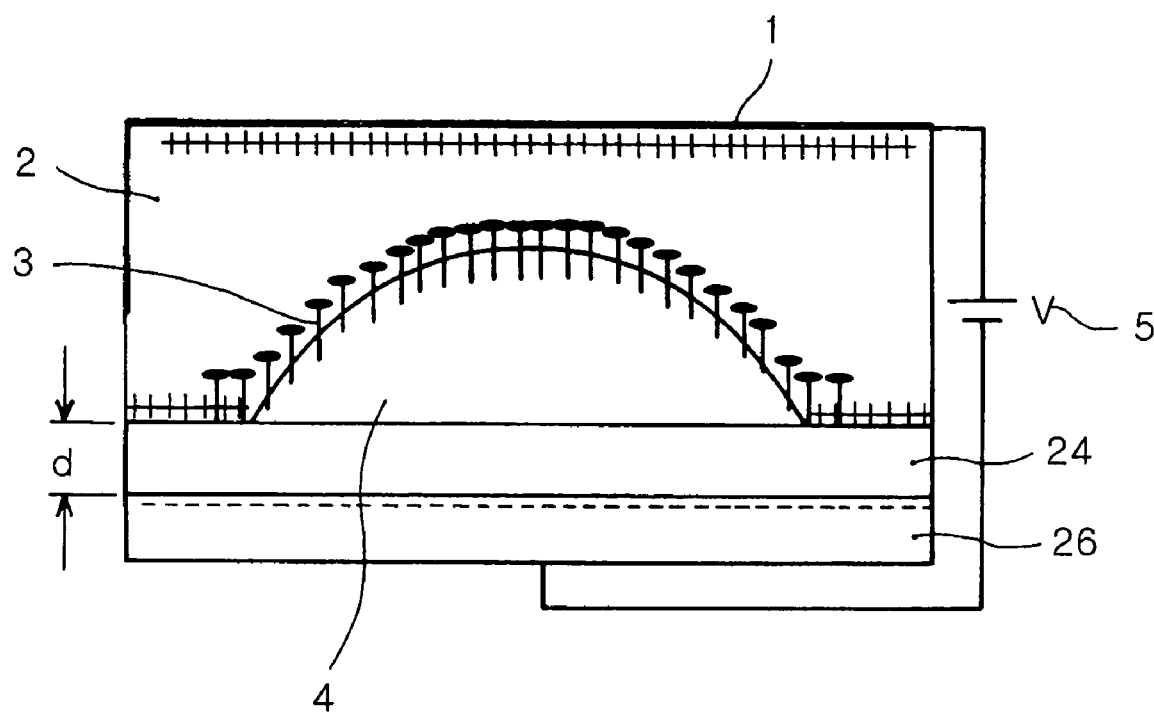
FIG. 2 is a schematic view illustrating the constitution of a variable focus liquid lens with a meniscus formed between a first liquid and a second liquid according to the present invention.

An example of the variable focus liquid lens according to the present invention is shown in FIG. 2.

As shown in FIG. 2, at least one of the first liquid 2 and the second liquid 4 contains the surfactant, and thereby the interfacial portion 3 interfacial portion between the first and second liquids is gathered by surfactant. At this time, the surfactant may be contained in either the first liquid or the second liquid only, or can be contained in both liquids, thereby decreasing the interfacial energy between the two liquids to reduce the driving voltage. In addition, as the interfacial portion is formed, there is no mixing of the two fluids, ensuring stability of the two liquids.

The surfactant may be contained in either the first liquid or the second liquid only, or in both liquids. FIG. 3(a) illustrates the case where the surfactant is contained in the first liquid (electrolyte) so that the interfacial portion 3 is formed from the first liquid, and FIG. 3(b) illustrates the case where the surfactant is contained in the second liquid (insulation liquid) so that the interfacial portion 3 is formed from the second liquid. FIG. 3(c) illustrates the case where the surfactant is contained in both the first and second liquids so that the interfacial portions 3 and 3' are formed from both the first and second liquids.

Moreover, in the case where at least one of the first and second liquids contains a high polymer surfactant according to the present invention, the high polymer surfactant reforms the rheological properties of the liquid to enable free control of the fluid movement between the insulation liquid and the electrolyte. In this case, the high polymer surfactant induces the single ion motion, ensuring electric stability. Such single ion motion prevents rapid change in the concentration gradient of the salt in the electrolyte, thereby enabling adequate control of the process of the electrowetting and ensuring electrochemical stability.

As described above, the surfactant may be contained in the first or the second liquid only, or in both liquids. Depending on the molecular structure of the surfactant, appropriate content of the surfactant may vary. However, too small an amount may lower the controlling effect of the interfacial energy. On the other hand, too large an amount may undermine the stability of the meniscus between the insulation liquid and the electrolyte, increasing viscosity due to increased density, which may be a cause of degradation of capability of the liquid lens. The first liquid may preferably contain 0.001 to 10 weight % of the surfactant when the surfactant is contained in the first liquid. The second liquid may preferably contain 0.001 to 10 weight % of the surfactant when the surfactant is contained in the second liquid. And each of the first liquid and the second liquid may preferably contain 0.001-10 weight % of surfactant when the surfactant is contained in both liquids.

The surfactant in the present invention may be any type of surfactant capable of achieving up to 20 dyne/cm, and preferably 0.1 to 20 dyne/cm of reduced interfacial energy between the first and second liquids. The surfactant appropriate for the present invention may be selected from but not limited to a group including anionic surfactant, cationic surfactant, amphoteric and nonionic surfactant, low molecule surfactant, and high molecule surfactant. Here, the low molecule surfactant in the present invention has about 100 to 10,000 molecules, and the high molecule surfactant has about at least 10,000 molecules.

The anionic surfactant typically includes Alkyl Carboxyl Salt (R—COONa), Alkyl Sulfate Salt (R—O—SO₃Na), Alkyl Sulphonate salt (R—SO₃Na), and R here represents hydrocarbon-based, fluorocarbon-based, or silicon-based group.

The cationic surfactant includes Alkyl primary amin salt (R—Na₂HCl), Alkyl secondary amin salt, Alkyl tertiary amin salt, and Alkyl quaternary ammonium, where R represents hydrocarbon-based, fluorocarbon-based or silicon-based group.

The low molecule surfactant may include but not limited to sodium lauryl sulphate, sodium lauryl sulphonate, sodium laurylate, n-hexyl benzene sulphonate, sodium octadecylsulphate, sodium octadecyl sulphonate, tetrapropylbenzene sulphonate, sodium alkyl phosphate ester, laurylbenzylammoniumchloride, stearylbenzylammoniumchloride, sethyltrimethylammoniumcholoride, sethyltrimethylammoniumchloride, stearyltrimethylammoniumchloride, steatyltrimethyammoniumchloride, dystearyldimethylammoniumchloride, methyl-1-oleyl amid ethyl-3-oleyl imidazolinium methyl sulphate, bis(acyloxyethyl) hydroxyethyl methyl ammonium methosulphate, methyl-1-oleyl amide ethyl-3-oleyl imidazolinium methyl sulphate, bis(acyloxyethyl)hydroxyethyl methyl ammonium methosulphate, methyl-1-oleyl amide ethyl-3-oleyl imidazolinium methyl sulphate, aminoethylimidazolin, hygroethylimidazolin, cocoamicopropylbetain, laurylbetaine, laurylamidopropylbetain, laurylmethylhydroxysulfobetain, disoudium cocoamphodiacetate and disodium cocoamphodiacetate/sodiumlaurylsulphate. At this time, the first liquid may preferably contain 0.001 to 10 weight %, and more preferably 0.01 to 5 weight % of the low molecule surfactant when the low molecule surfactant is contained in the first liquid. And the second liquid may preferably contain 0.001 to 10 weight %, and more preferably 0.01 to 5 weight % of the low molecule surfactant when the low molecule surfactant is contained in the second liquid. Each of the first liquid and the second liquid contains 0.001 to 10 weight %, and more preferably 0.1 to 5 weight % of the low molecule surfactant when the low molecule surfactant when the low molecule surfactant is contained in both liquids.

The high molecule surfactant usable in the present invention may include but not limited to a copolymer of propylene oxide and ethylene oxide, a copolymer of acryl acid and alkyl acrylate, a copolymer of acryl amid and heteroacryl monomer, polyvinyl alcohol, ethylene oxide added polyalkylphenol, polyvinylpyridium salt and carboxymethyl cellulose, but preferably polyacrylic acid. At this time, the first liquid may preferably contain 0.001 to 10 weight %, and more preferably 0.01 to 5 weight % of the high polymer surfactant when the high polymer surfactant is contained in the first liquid. The second liquid may preferably contain 0.001 to 10 weight %, and more preferably, 0.01 to 5 weight % of the high polymer surfactant when the high polymer surfactant is contained in the second liquid. Each of the first and second liquids contains 0.001 to 10 weight %, and more preferably, 0.01 to 5 weight % of the high polymer surfactant when the high polymer surfactant is contained in both liquids.

In addition, the first liquid and the second liquid may further include ionic polymer. The ionic polymer usable in the present invention may include but is not limited to AMP-acrylate copolymer, poly (vinylpyrrolidone/dimethylaminoethylmethacrylate), quaternary poly (vinylpyrrolidone/dimethylaminoethylmethacrylate), methacryloyl ethylbetaine/methacrylate copolymer, quaternary poly (vinylpyrrolidone/dimethylaminoethylmethacrylate) and polyvinylpyrrolidone/vinyl acetate copolymer. The first liquid may preferably contain 0.001 to 10 weight % of the ionic polymer when the ionic polymer is contained in the first liquid. The second liquid may preferably contain 0.001 to 10 weight % of the ionic polymer when the ionic polymer is contained in the second liquid. Each of the first and second liquids may preferably contain 0.001 to 10 weight % of ionic polymer when the ionic polymer is contained in both liquids.

In addition, although not containing salt in the molecule, material having a chemical structure manifesting a function of weakening surface energy may be included in at least one of the first and second liquids. Such material includes, for example, polyethylene glycols (R—(CH₂CH₂O)nH (R is hydrocarbon-based, fluorocarbon-based or silicon-based group)) obtained by polymerization of ethylene oxide or propylene oxide monomers non-ionic organic compounds such as polyvalent alcohols such as sorbitan ester and Tween. In this case, salt may additionally be added to manufacture electrolyte or insulation liquid in order to obtain the effects of the present invention. The first liquid may preferably contain 0.001 to 10 weight % of such material when the material is contained in the first liquid. The second liquid may preferably contain 0.001 to 10 weight % of such material when the material is contained in the second liquid. Each of the first and second liquids may preferably contain 0.001 to 10 weight % of such material when the material is contained in both the first and second liquids.

In addition, the first liquid (electrolyte) may further contain at least one type of inorganic salt. The inorganic salt usable in the present invention includes generally known inorganic salt for electrowetting device, and may include but not limited to, for example, sodium salt, silicate, nitrates, nitrite, phosphate, borate, magnesium salt, iron salt, copper salt, zinc salt, manganate, cobalt salt 및lithium salt, and preferably is sodium sulphate. The first liquid may preferably contain 0.001 to 20 weight % of inorganic salt out of the total weight.

According to the present invention, the variable focus liquid lens using electrowetting comprises a conductive first liquid and an insulating second liquid, wherein at least one of the first and second liquids has a surfactant for reducing interfacial energy of up to 20 dyne/cm between the first and second liquids, and an interfacial portion between the first and second liquids is gathered by surfactant. For the rest of the structural features, any type of structure of the conventional liquid lens using electrowetting can be applied. For example, except for the constitution of the first and second liquids as described above, and the interfacial portion between the first and second liquids is gathered by surfactant, the rest of the structural features of the variable focus liquid lens according to the present invention may be the same as those of the liquid lenses disclosed in U.S. Pat. No. 6,369,954, PCT WO 00/58763 and Japanese Patent Application No. 1999-155341.

In an embodiment, the variable focus liquid lens of the present invention is capable of varying focus by changing the shape of meniscus formed by the first liquid and the second liquid which are non-miscible, having different refraction indexes. The first liquid composed of electrolyte and the second liquid composed of insulation liquid are disposed in a cell and the second liquid forming a droplet, and a droplet contact area is formed in contact with the droplet in the cell. Also, at least one of the first and second liquids contains a surfactant to reduce interfacial energy between the first and second liquids, whereby an interfacial portion between the first and second liquids is gathered by surfactant. There are also means including an electrode and an insulation layer disposed between the electrode and the first and second liquids for applying voltage between the electrode and the first liquid, and the voltage applied by the voltage-applying means is adjusted to change the shape of the meniscus with reduced driving voltage.

The variable focus liquid lens with above constitution has relatively reduced level of driving voltage, preferably, reduced by about 50%, from the conventional variable focus liquid lens using electrowetting.

The present invention will further be explained in detail through examples, which is only exemplary but not limitative of the present invention.

EXAMPLES

Figure 3:
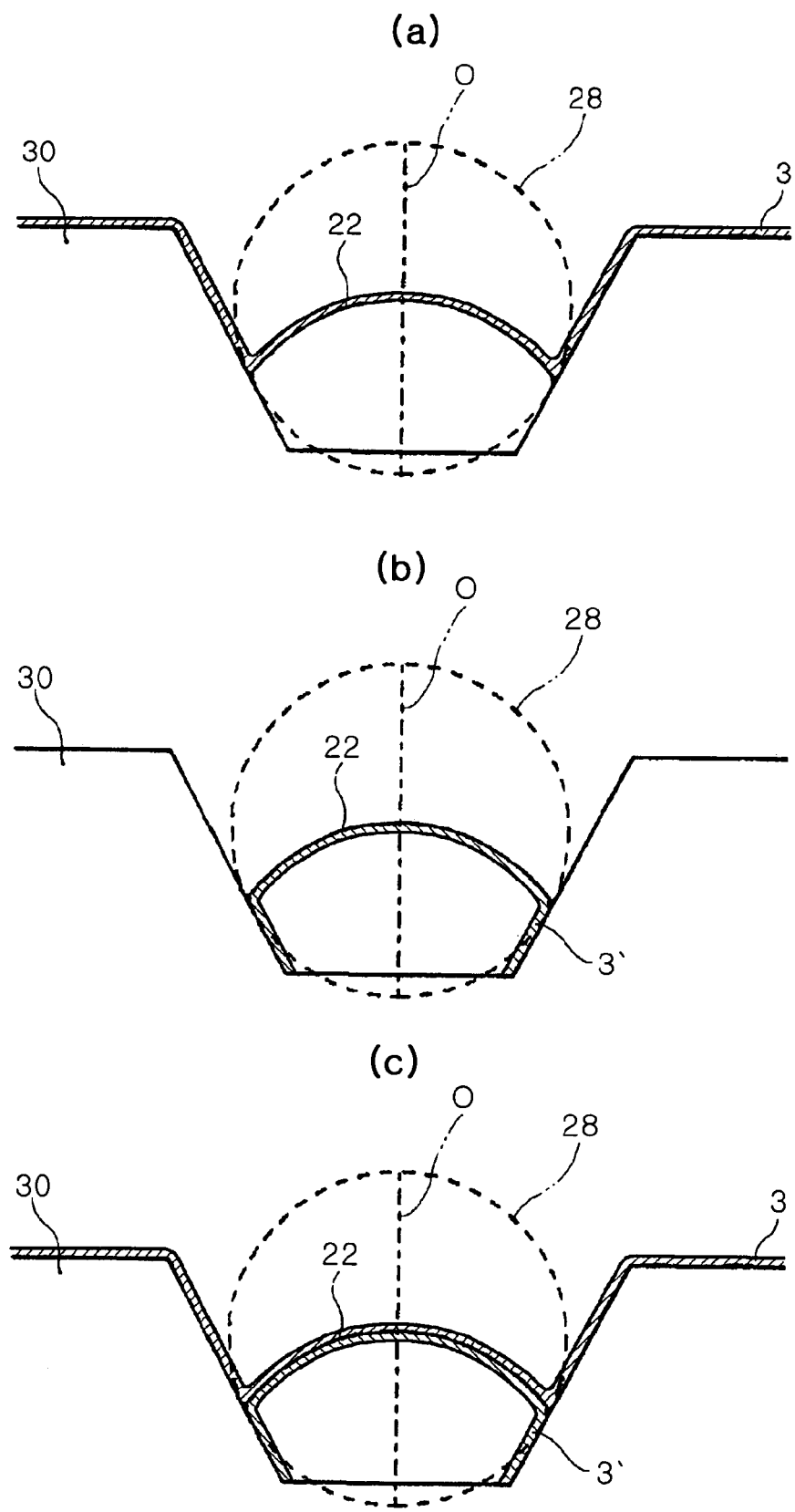
FIG. 3 is a schematic cross-sectional view illustrating the constitution of the variable focus liquid lens according to an embodiment of the present invention, in which (a) illustrates a case where a surfactant is contained in electrolyte to form an interfacial portion, (b) illustrates a case where a surfactant is contained in insulation liquid to form an interfacial portion, and (c) illustrates a case where a surfactant is contained in both electrolyte and insulation liquid to form an interfacial portion.

In these examples, in order to confirm the effect of the liquid lens containing surfactant, surfactant-containing electrolyte and insulation liquid were prepared to fabricate the liquid lens in FIG. 3. Then, the driving voltage and the variable dioptrie were measured to observe the reduction of the driving voltage. The compositions of the electrolyte and the insulation liquid are provided in Table 1 in order to compare the case of containing the surfactant and the case of not containing the surfactant. For the surfactant, non-ionic fluorine alkylacryl-based high polymer surfactant (3M, FC4430) and silicon-based surfactant (DHM, CAS: 145686-74-4) were used. The water used for preparation of the electrolyte was 3DW. For the fabrication of the liquid lens, silicon oil and dibromohexane silicon oil available from Dow Corning were used with the compositions shown in Table 1.

COMPARATIVE EXAMPLE

Fabrication of the Lens

A cell for containing the liquid lens used in the experiment has upper and lower parts. The upper part is composed of transparent polycycloolefin, with the inner part coated with Ni/V metal film so that the voltage is applied via the metal film having a thickness of 0.25±0.02 μm. The lower part is made of the same polycycloolefin as the upper part, with the inner part in contact with water is coated with perylene film in a thickness of 2.5±0.2 μm which is a high polymer insulation material, and underneath the insulation film, Ni/V metal film is coated in a thickness of 0.25±0.02 μm.

Fabrication of the Insulation Liquid

For the insulation liquid constituting the droplet, the silicon oil DC704 (refraction index: 1.6, density: 1.07)and the dibromohexane available from Dow Corning were mixed 9 to 1 and used.

Fabrication of the Electrolyte

For the conductive liquid, electrolyte composed of inorganic salt was used. That is, a transparent solution containing 20 weight % of LiCl as a conductive component was prepared.

The above droplet and conductive liquid were inserted in the cell of the lens to obtain a liquid lens device.

From this liquid lens device, the driving voltage and the variable dioptrie were measured.

Measurement of the Driving Voltage

The voltage applied to the liquid lens was increased gradually to measure the voltage at the point in which the curvature of the part at which the electrolyte and the insulation liquid are in contact with each other starts to change.

Measurement by Hysteresis

The focus distance was measured while gradually increasing the voltage applied to the liquid lens. Conversely, the focus distance was measured while gradually decreasing the voltage applied to the liquid lens. When the difference between the two focus distances was the greatest, the difference between the focus distances was measured by hysteresis.

Example 1-5

Except that the conductive liquid and the insulation liquid was prepared to contain non-ionic fluorine alkylacryl-based high polymer surfactant (3M, FC4430) and silicon-based surfactant (DHM, CAS:145686-74-4) as shown in Table 1 below, the liquid lens was obtained through the same procedures as in the above Comparative Example.

Using the liquid lens obtained from the above process, the driving voltage and the variable dioptrie were measured through the same procedures as in the Comparative Example.

The compositions of the electrolyte and the insulation liquid used in Comparative Example and Examples 1-5 are shown in Table 1.

TABLE 1

Compositions of the electrolyte and the insulation liquid used in Comparative Example and Examples 1 to 5 (weight ratio)

| | | Comparative | Example 1 | Example 2 | Example 3 | Example 4 | Example 5 |
|---|---|---|---|---|---|---|---|
| Electrolyte | $H_2O$ | 100 | 80 | 80 | 80 | 80 | 80 |
| | LiCl | 0 | 20 | 20 | 20 | 20 | 20 |
| | $Na_2SO_4$ | 0.2 | 0 | 0 | 0 | 0 | 0 |
| | FC4430 (3M) (non-ionic fluorine alkylacryl-based high polymer surfactant) | — | — | 0.003 | 0.003 | 0.01 | 0.01 |
| Insulation liquid | DC704 (Dow Corning) (Silicon oil, refraction | 90 | — | 90 | — | 90 | 90 |

TABLE 1-continued

Compositions of the electrolyte and the insulation liquid used in Comparative Example and Examples 1 to 5 (weight ratio)

| | Comparative | Example 1 | Example 2 | Example 3 | Example 4 | Example 5 |
|---|---|---|---|---|---|---|
| index: 1.6, density: 1.07) | | | | | | |
| DC702 (Dow Corning) (Silicon oil, refraction index: 1.52, density: 1.09) | — | 90 | — | 90 | — | — |
| Dibromohexane | 10 | 10 | 10 | 10 | 10 | 10 |
| FC4430 (3M) (non-ionic fluorine alkylacryl-based high polymer surfactant) | — | 0.003 | — | 0.003 | — | — |
| DHM (CAS: 145686-74-4) (silicon-based surfactant) | — | — | — | — | 0.01 | 0.005 |

The capabilities of the liquid lenses obtained in Comparative Example and Example 1-5 were evaluated and shown in Table 2.

TABLE 2

Comparison of driving voltage variable dioptrie distances

| | Comparative | Example 1 | Example 2 | Example 3 | Example 4 | Example 5 |
|---|---|---|---|---|---|---|
| Dioptrie (0 V) | −1 | 0 | 0 | 0 | 0 | 0 |
| Dioptrie (40 V) | 10.87 | 61 | 72 | 79 | 71 | 70 |
| Variable dioptrie | 11.87 | 61 | 72 | 79 | 71 | 70 |

As noticeable from Table 2, compared with Comparative Example which did not use the surfactant, the liquid lens (Examples 1-5) using the surfactant according to the present invention obtains larger variable dioptrie at the same level of voltage, indicating that the driving voltage required is significantly lower.

The variable focus liquid lens according to the present invention has reduced level of driving voltage and an interfacial portion between the two liquids, which are substantially non-miscible, ensuring stability of the two fluids.

While the present invention has been shown and described in connection with the preferred embodiments, it will be apparent to those skilled in the art that modifications and variations can be made without departing from the spirit and scope of the invention as defined by the appended claims.

What is claimed is:

1. The A variable focus liquid lens using electrowetting, comprising a conductive first liquid and an insulating second liquid:
   wherein at least one of the first liquid composed of electrolyte and the second liquid composed of insulating liquid comprises a surfactant for reducing interfacial energy between the first and second liquids, and
   whereby an interfacial portion between the first and second liquids is gathered by surfactant to reduce driving voltage wherein interfacial energy between the first and second liquids is 0.1 to 20 dyne/cm.

2. The variable focus liquid lens according to claim 1, wherein the first liquid comprises 0.001 to 10 weight % of the surfactant.

3. The variable focus liquid lens according to claim 1, wherein the second liquid comprises 0.001-10 weight % of the surfactant.

4. The variable focus liquid lens according to claim 1, wherein the first liquid comprises 0.001 to 10 weight % of the surfactant and the second liquid comprises 0.001 to 10 weight % of the surfactant.

5. The variable focus liquid lens according to claim 1, wherein the surfactant is selected from a group consisting of anionic, cationic, amphoteric and non-ionic surfactant, low molecule surfactant, high molecule surfactant, and a mixture thereof.

6. The variable focus liquid lens according to claim 1, wherein at least one of the first and second liquids further comprises ionic polymer.

7. The variable focus liquid lens according to claim 6, wherein the first liquid comprises 0.001 to 10 weight % of the ionic polymer.

8. The variable focus liquid lens according to claim 6, wherein the second liquid comprises 0.001 to 10 weight % of the ionic polymer.

9. The variable focus liquid lens according to claim 6, wherein the first liquid comprises 0.001 to 10 weight % of the ionic polymer and the second liquid comprises 0.001 to 10 weight % of the ionic polymer.

10. A variable focus liquid lens capable of varying focus by changing the shape of interface formed by a first liquid and a second liquid being non-miscible and having different refraction indexes, comprising:
   means for applying voltage between the electrode and the first liquid, the voltage applying means including an electrode and an insulation layer disposed between the electrode and the first and second liquids,
   wherein the first liquid composed of electrolyte and the second liquid composed of insulation liquid are disposed in a cell and the second liquid forming a droplet, and a droplet contact area is formed in contact with the droplet in the cell,
   wherein at least one of the first and second liquids comprises at least one surfactant to reduce interfacial energy between the first and second liquids, whereby an interfacial portion between the first and second liquids is gathered by surfactant, and wherein the voltage applied by the voltage-applying means is adjusted to change the shape of the interface with reduced driving voltage, and the interfacial energy between the first and second liquids is 0.1 to 20 dyne/cm.

11. The variable focus liquid lens according to claim 10, wherein the first liquid comprises 0.001 to 10 weight % of the surfactant.

12. The variable focus liquid lens according to claim 10, wherein the second liquid comprises 0.001 to 10 weight % of the surfactant.

13. The variable focus liquid lens according to claim 10, wherein the first liquid comprises 0.001 to 10 weight % of the surfactant and the second liquid comprises 0.001 to 10 weight % of the surfactant.

14. The variable focus liquid lens according to claim 10, wherein the surfactant is selected from a group consisting of anionic, cationic, amphoteric and nonionic surfactant, low molecule surfactant, high molecule surfactant, and a mixture thereof.

15. The variable focus liquid lens according to claim 10, wherein at least one of the first and second liquids further comprise ionic polymer.

16. The variable focus liquid lens according to claim 15, wherein the first liquid comprises 0.001 to 10 weight % of the ionic polymer.

17. The variable focus liquid lens according to claim 15, wherein the second liquid comprises 0.001 to 10 weight % of the ionic polymer.

18. The variable focus liquid lens according to claim 15, wherein the first liquid comprises 0.001 to 10 weight % of the ionic polymer and the second liquid comprises 0.001 to 10 weight % of the ionic polymer.

* * * * *